United States Patent [19]
Yoshikawa et al.

[11] Patent Number: 4,910,103
[45] Date of Patent: Mar. 20, 1990

[54] BATTERY PACK FOR A PORTABLE RADIOTELEGRAPHIC UNIT

[75] Inventors: Tadashi Yoshikawa, Kanagawa; Akira Ogawa, Chiba; Tadashi Okuto, Kanagawa; Susumu Shirakawa, Saitama, all of Japan

[73] Assignee: Nippon Molicel Corp., Tokyo, Japan

[21] Appl. No.: 258,989

[22] Filed: Oct. 12, 1988

[30] Foreign Application Priority Data

Dec. 10, 1987 [JP] Japan .................................. 62-188710

[51] Int. Cl.$^4$ ............................................. H07M 2/00
[52] U.S. Cl. ........................................ 429/61; 429/7; 429/92
[58] Field of Search ................................. 429/7, 61, 92

[56] References Cited

U.S. PATENT DOCUMENTS

| | | | |
|---|---|---|---|
| 3,196,357 | 7/1965 | Hoag | 429/92 X |
| 3,526,822 | 9/1970 | Dickfeldt et al. | 429/61 X |
| 3,639,173 | 2/1972 | Stachurski | 429/61 X |

FOREIGN PATENT DOCUMENTS

| | | | |
|---|---|---|---|
| 3100503 | 8/1982 | Fed. Rep. of Germany | 429/92 |
| 1148526 | 9/1985 | U.S.S.R. | 429/92 |

Primary Examiner—Stephen J. Kalafut
Attorney, Agent, or Firm—Wegner & Bretschneider

[57] ABSTRACT

The present invention relates to a battery pack for supplying power to a portable radiotelegraphic unit. The battery pack comprises a rechargeable battery whose voltage varies with time in such a manner that is residual capacity can be estimated from the detected voltage of the battery, a voltage detector for detecting the voltage of the battery, and an indicator for visibly displaying the voltage detected by the voltage detector. With the above construction, the battery can be recharged when the battery voltage reaches a lower value and the discharging of the battery can be stopped when the battery voltage reaches an upper value. As a result, the battery is prevented from the overcharging and overdischarging, and the life and reliability of the battery are increased.

7 Claims, 4 Drawing Sheets

BATTERY PACK FOR A PORTABLE RADIOTELEGRAPHIC UNIT

BACKGROUND OF THE INVENTION

1. Field of the Invention

The present invention relates to a battery pack for supplying power to a portable radiotelegraphic unit, and more specifically, to a battery pack in which a lithium secondary battery is used and charging or discharging of the battery can be effectively controlled according to the detected voltage of the battery.

2. Description of related art

In general, the nickel-cadmium battery (hereinafter called "Ni-Cd battery") is widely used as a battery in a battery pack for a portable radiotelegraphic unit.

Referring to FIG. 1, there is shown a voltage versus time curve of the Ni-Cd battery. As shown in this figure, the discharge characteristic of the Ni-Cd battery is such that the battery voltage remains almost constant for a certain period and then drops abruptly. Due to the nature of the discharge characteristic, the user cannot estimate the residual capacity of the Ni-Cd battery from its voltage. In other word, it is impossible for the user to estimate how long the battery can be used without recharging.

In a conventional battery pack including the Ni-Cd battery, charging and discharging of the battery are repeated alternately regardless of the residual capacity of the battery. As a result, the battery tends to be frequently overcharged or overdischarged, and consequently the life of the battery is often shortened.

SUMMARY OF THE INVENTION

Accordingly, it is an object of the present invention to provide a battery pack capable of estimating the residual capacity of the battery by detecting the battery voltage.

Another object of the present invention is to provide such a battery pack capable of displaying an indication that the battery voltage has reached the upper voltage and the charging process is completed.

Still another object of the present invention is to provide a battery pack which automatically control charging and discharging of the battery so that the battery is not overcharged nor overdischarged.

The above and other objects of the present invention are achieved by a battery pack constructed in accordance with the present invention which comprises a battery which can be recharged, the battery voltage varying against time in such a manner that residual capacity can be estimated from the detected voltage of the battery, a voltage detector for detecting the voltage of the battery, and an indicator for visibly displaying the voltage detected by the voltage detector. The battery is preferably a lithium secondary battery.

Turning again to the FIG. 1, there is shown a voltage versus time curve of a lithium secondary battery. Since the lithium battery has such a discharge characteristic that the battery voltage decreases gradually without any abrupt drop, it is possible to estimate the residual capacity of the battery by simply detecting the battery voltage.

With the above construction, the battery can be recharged when the battery voltage reaches a certain lower value, which protects the battery from overdischarging. Similarly, the charging of the battery can be stopped when the battery voltage reaches a certain upper value, which protects the battery from overcharging. Thus, the battery can be protected from both overcharging and overdischarging so that the life of the battery is not shortened. The battery pack according to the present invention is, therefore, highly reliable.

In a specific embodiment, the indicator includes a light which turns on or flashes when the battery voltage reaches the upper voltage. It is, therefore, ensured that the battery is not overcharged.

In another embodiment, the battery pack further comprises means for stopping the charging of the battery when the battery voltage reaches the upper value, and stopping the discharging of the battery when the battery voltage reaches the lower value. Thus, the battery is automatically protected from overcharging and overdischarging.

The above and other objects, feature and advantages of the present invention will become apparent from the following detailed description of preferred embodiment of the present invention with reference to the accompanying drawings.

DESCRIPTION OF THE PREFERRED EMBODIMENTS

Figure 1:
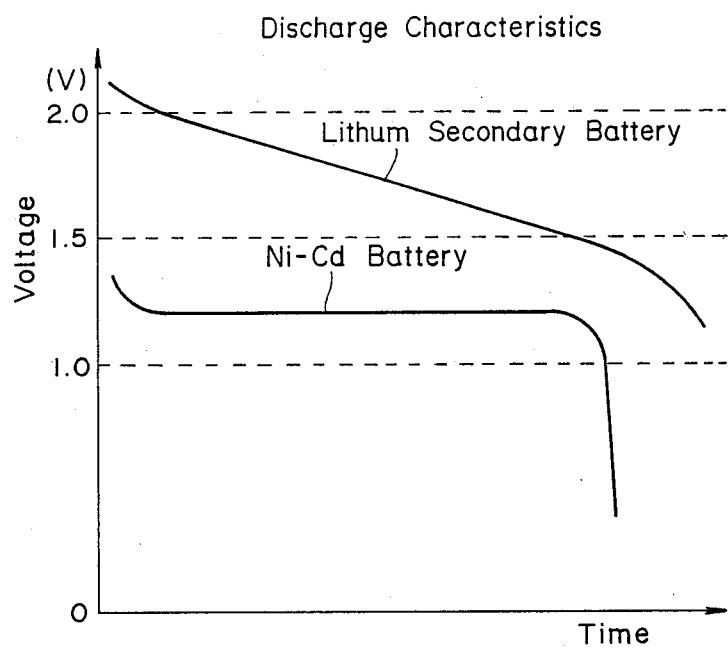
FIG. 1 is a diagram showing the discharge characteristics of the Ni-Cd battery and a lithium secondary battery.
Figure 2:
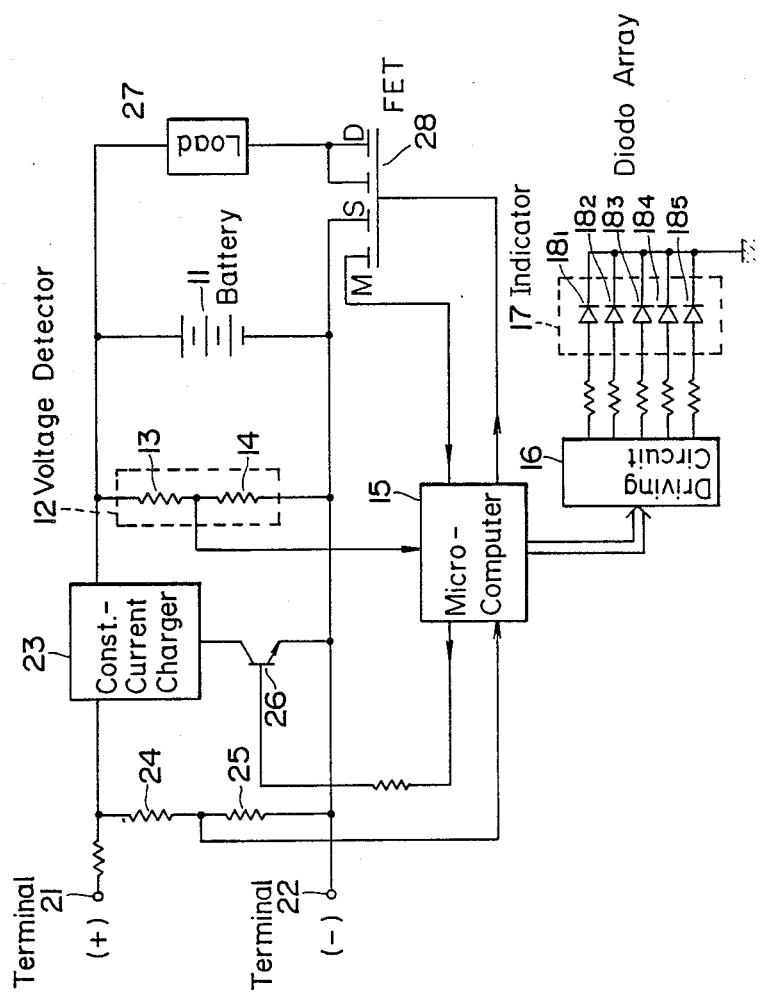
FIG. 2 is a block diagram showing the construction of a battery pack in accordance with the present invention.

Referring to FIG. 2, there is shown a first embodiment of the battery pack constituted in accordance with the present invention. In the battery pack shown in the figure, a microcomputer is used not only to display the battery voltage but also to control the charging and discharging of the battery according to the battery voltage.

The battery pack includes a voltage detector 12 for detecting the voltage of a lithium secondary battery 11. More specifically, resistors 13 and 14 are coupled in series between the terminal of the battery 11. The voltage proportion to the battery voltage is detected at the node formed between the two resistors 13 and 14. The detected voltage is input to a microcomputer 15. The output of the microcomputer 15 is connected via a driving circuit 16 to an indicator 17. The indicator 17 includes, for example, five light emitting diodes $18_1$ to $18_5$. The indicator 7 displays the battery voltage in response to the detected voltage in such a manner as described below.

Figure 4:
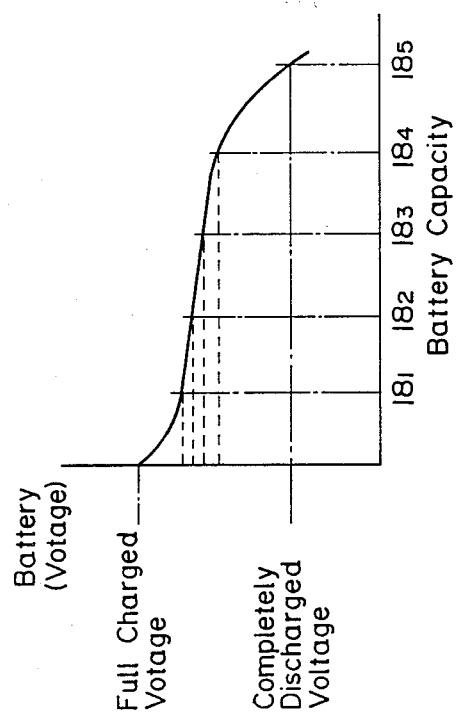
FIG. 4 is a diagram showing the relationship between the battery capacity divided into five regions and the battery voltage corresponding thereto.

In the present embodiment, the battery capacity is divided equally into five regions and accordingly the potential difference between the fully-charged voltage and completely-discharged voltage is divided into five regions as shown in FIG. 4. The microcomputer 15 judges in which region the battery voltage is and according to the judgment causes one of the light emitting diodes $18_1$ to $18_5$ to turn on or flash.

When either the light emitting diode $18_1$ or $18_2$ turns on in blue, this indicates that the residual capacity is sufficient. When the light emitting diode $18_3$ turns on in yellow, this tells the user to pay attention to the residual capacity. When the light emitting diode $18_4$ turns on in orange, this tells the user to be very cautious about the residual capacity of the battery. When the light emitting diode $18_5$ turns on in red, this tells the user that the residual capacity has almost run out.

In the operation of charging the battery, direct current is applied between two terminals 21 and 22. The direct current thus applied is applied through a constant-current charger 23 between the two terminals of the lithium secondary battery 11. Simultaneously, the voltage divided by a voltage divider, which is formed by two resistors 24 and 25 connected in series, is input to the microcomputer 15. The microcomputer 15 compares the divided voltage with a predetermined value and finally judges whether the charging voltage is normal.

Moreover, the voltage detected by the voltage detector 12 is also checked. When the charging voltage reaches the fully-charged level, that is, 2.35V per cell, the microcomputer 15 causes the constant-current charger 23 to stop by means of a transistor 26.

A load 27 is coupled through a field-effect transistor (hereinafter called "FET") 28 between the two terminals of the battery 11. Thus, the voltage corresponding to the load current through the load 27 is generated at the terminal M of the FET 28, the voltage at the terminal M being input to the microcomputer 15. If excess current is generated in the load 27, the microcomputer 15 controls the gate of the FET 28 to switch off the FET 28. On the other hand, if the voltage detected by the voltage detector 12 drops below a predetermined voltage, that is, 1.1 V per cell, the microcomputer 15 switches off the FET 28 to stop the discharging of the battery.

Figure 3:
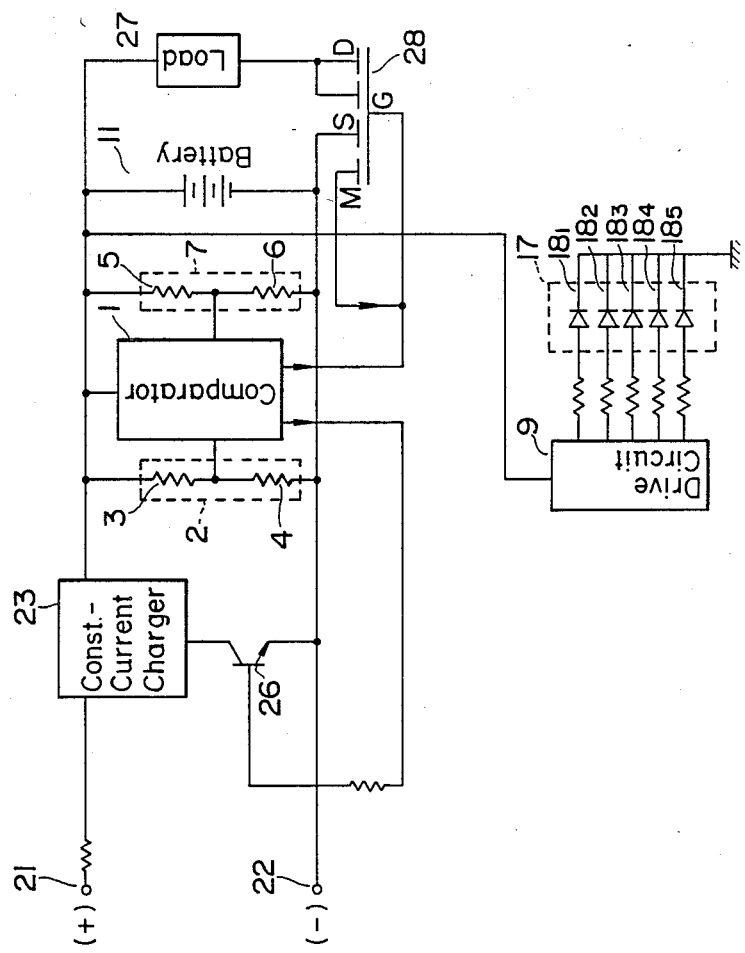
FIG. 3 is a block diagram showing another embodiment of the battery pack in accordance with the present invention.

Turning to FIG. 3, there is shown another embodiment of the battery pack constituted in accordance with the present invention. In the battery pack shown in the figure, all the elements other than a comparator are identical to those illustrated in FIG. 2. The comparator simply replaces the microcomputer in the first embodiment. Explanation will be made below, with emphasis on the differences between the first and second embodiments.

The battery voltage is compared with the upper voltage (fully-charged voltage) detected by upper voltage detector 2 across two resistors 3 and 4 coupled in series. When the battery voltage reaches the upper voltage, that is, 2.35 V per cell, the output of a comparator 1 switches off the constant-current charger 23 through the transistor 26. Similarly, the battery voltage is compared with the lower voltage (completely-discharged voltage) detected by lower voltage detector 7 across two resistors 5 and 6 coupled in series. When the battery voltage drops below the lowermost voltage, that is, 1.1 V per cell, the output of the comparator 1 switches off the FET 28. The driving circuit 9 drives the indicator 17 in a linear way to turn on the light emitting diodes 18 to 18 sequentially in response to the input voltage.

The above described battery packs can be selectively employed in view of cost size and environmental problems.

The invention has thus been shown and described with reference to specific embodiments. It should be noted, however, that the invention is in no way limited to the details of the illustrated structures but charges and modifications may be made within the scope of the appended claims.

We claim:

1. A battery pack for supplying power to a portable radiotelegraphic unit, comprising:
   a rechargeable battery whose voltage drops at a distinct rate against time so that the residual capacity of the battery can be estimated on the basis of the battery voltage;
   a voltage detector for detecting the voltage of the battery;
   an indicator for visibly displaying the battery voltage detected by the voltage detector;
   means for charging the battery when the indicator displays that the battery voltage is below a predetermined lower value so that the battery is not overdischarged, and means for stopping the charging of the battery when the indicator displays that the battery voltage reached a predetermined upper value so that the battery is not overcharged, wherein the battery is a lithium secondary battery, and wherein the indicator includes a plurality of light emitting diodes which turn on sequentially in response to the value of the detected voltage of the battery.

2. A battery pack for supplying power to a portable radiotelegraphic unit, comprising:
   a rechargeable battery whose voltage drops at a distinct rate against time so that the residual capacity of the battery can be estimated on the basis of the battery voltage;
   a voltage detector for detecting the voltage of the battery;
   an indicator for visibly displaying the battery voltage detected by the voltage detector;
   a charging circuit path for delivering power to said rechargeable battery; and
   means for closing said charging circuit path to permit a charging operation for charging said rechargeable battery when the battery voltage drops below a predetermined lower value, and for opening said charging circuit path to terminate said charging operation of said rechargeable battery when the battery voltage reaches a predetermined upper value, whereby said battery is protected from being overcharged.

3. A battery pack as set forth in claim 2 wherein the battery is a lithium secondary battery, and wherein the indicator includes a plurality of light emitting diodes which turn on sequentially in response to the value of the detected voltage of the battery.

4. A battery pack as set forth in claim 2 wherein the indicator includes at least one light which turns on or flashes when the battery voltage reaches the upper level value so as to provide an indication that the battery has been fully charged.

5. A battery pack as set forth in claim 4 wherein the battery is a lithium secondary battery.

6. A battery pack as set forth in claim 2 further comprising means for comparing the detected voltage of the battery with the lower value, and for causing the discharging of the battery to stop when the detected voltage drops below the lower value.

7. A battery pack as set forth in claim 6 wherein the battery is a lithium secondary battery, and wherein the indicator includes a plurality of light emitting diodes which turn on sequentially in response to the value of the detected voltage of the battery.

* * * * *